United States Patent [19]

Dyla

[11] Patent Number: 5,316,588
[45] Date of Patent: May 31, 1994

[54] SYSTEM FOR SPRAYING MATERIAL ON TUBING AND RECLAIMING EXCESS MATERIAL

[75] Inventor: James E. Dyla, Bloomfield Hills, Mich.

[73] Assignee: AMCOL Corporation, Dearborn, Mich.

[21] Appl. No.: 897,989

[22] Filed: Jun. 16, 1992

[51] Int. Cl.$^5$ .................................................. B08B 9/02
[52] U.S. Cl. .................................. 134/9; 15/104.04; 118/123; 118/DIG. 11; 134/10; 210/167; 427/345; 427/421
[58] Field of Search .............. 118/100, 125, 300, 419, 118/DIG. 10, DIG. 11, DIG. 13, 325, 123; 427/345, 355, 421; 156/433; 210/167, 767; 15/104.04, 88; 134/9, 10

[56] References Cited

U.S. PATENT DOCUMENTS

| | | | |
|---|---|---|---|
| 19,316 | 2/1858 | Thayer et al. | 118/DIG. 13 |
| 2,338,266 | 1/1944 | Skoning | 118/DIG. 11 |
| 2,649,757 | 8/1953 | Diamond | 118/DIG. 11 |
| 3,467,061 | 9/1969 | McHugh | 118/123 |
| 3,530,526 | 9/1970 | Schmidt | 15/88 |
| 4,356,218 | 10/1982 | Chiu et al. | 118/125 |
| 4,371,415 | 2/1983 | Tanaka | 156/433 |
| 4,503,577 | 3/1985 | Fowler | 15/104.04 |
| 4,704,986 | 11/1987 | Remp et al. | 118/DIG. 11 |
| 4,734,950 | 4/1988 | Schenke et al. | 15/104.04 |

*Primary Examiner*—Joseph W. Drodge
*Attorney, Agent, or Firm*—Dykema Gossett

[57] ABSTRACT

A spray applicator apparatus and method for applying material to tubing and cold roll formed sections in a closed environment includes foam rubber wipes which are secured at the entrance and exit openings for the tubing. The wipe at the entry opening serves to remove particles and the wipe at the exit opening services to equally disperse excess material on the tubing. Within the enclosure are atomizing spray nozzles which apply material to the outer surface of tubing. The material may be applied to tubing during in-line processing, before the tubing is cut or sectioned, and the wipes may be replaced while tubing extends through the enclosure.

19 Claims, 3 Drawing Sheets

SYSTEM FOR SPRAYING MATERIAL ON TUBING AND RECLAIMING EXCESS MATERIAL

BACKGROUND OF THE INVENTION

This application relates to a spray applicator system used to apply material to tubular products and cold roll formed sections.

Tubing or cold roll formed sections must often be treated with cleaners, rust preventatives, or other treatment materials after being formed. One known method of applying cleaners, or other treatment materials, to tubing is dipping. The dipping operation involves bundling sections of tubing, and placing the tubing in a dip tank containing the desired material. Another known method of applying material to tubing is by the use of a manually guided sprayer. Rust preventatives are often applied in this manner.

Other known methods of applying material to tubing are accomplished during in-line processing. These methods allow for tubing to be treated during the formation operations before the tubing is cut into sections. One known method for applying cleaners is by direct spray. The direct spray method involves placing spray nozzles around tubing after a forming operation. The nozzles are in the open with a collection means or drain under the nozzles. Another known in-line application system is the wipe method. With the wipe method, a saturated cloth is placed around tubing after a forming operation. The cloth is kept saturated by a drip system which continues to apply material to it.

All of the known prior art application methods for treatment of tubing is accomplished in an open environment. With these methods, the treatment material may escape into the air posing environmental problems. Additionally, most prior art methods are inefficient. Excess chemicals must be used which cannot be reclaimed. Further, the most commonly used prior art application methods are not completed in-line, and must be applied to tubing sections after being cut.

To summarize, all of the above application methods have disadvantages depending upon the type treatment and the material being applied. All of the methods involve exposing potentially harmful chemicals to the environment. For most of the discussed methods, it is either impossible, or prohibitively expensive, to reclaim the material used in treatment. Further, none of the known prior art methods allow for a precise amount of material to be applied without waste, or for material to be applied in an enclosed environment.

SUMMARY OF THE INVENTION

The present invention discloses an improved method for applying cleaners, rust preventatives, and other treatment material to tubular products and cold roll formed sections in an enclosed environment. With the inventive system, a precise, appropriate amount of material may be applied 360 degrees around a section as it passes through an enclosure, where the material cannot escape the enclosure and excess material may be reclaimed and reused.

In a disclosed embodiment of the present invention, atomizing spray nozzles are positioned within an enclosed structure to apply appropriate material to cover the tubing as it passes through the enclosure. To eliminate loss of material and to ensure an enclosed environment, replaceable foam wipes are used at the entrance and exit walls of the enclosure. Each wipe includes an aperture in the center of the wipe for the tubing to pass through. The entry wipe is used to remove incoming particles, foreign matter, and debris, as well as providing a seal at the entry wall of the enclosure. The exit wipe is used to remove or equally disperse the material applied within the enclosure, as well as providing a seal at the exit wall of the enclosure. In this manner, a precise amount of material may be applied to the tubing, and any unused portion may be recovered within the sealable enclosure.

The wipes are secured by the use of a two component bracket which is removable while tubing remains in the enclosure. This allows for replacing the wipes in-line during the forming operation without having to cut the tubing. Wipes which are added later include a slit which extends from the aperture to an edge of the wipe.

The use of a sealable enclosure allows for an atomizing spray to be used to apply the material to tubing without excessive release of material to the environment. The atomizing nozzles are supplied pressurized air and liquid material which allows material to be applied in precise amounts. This feature is important where expensive, or harmful chemicals are applied. In some applications, the tubing passes through no more than a mist formed of the material, which can only be accomplished if spraying in an enclosed environment. This application system essentially eliminates overspray, reducing the need to reclaim or recycle the material.

In a further feature of the present invention, the enclosure includes a top cover which is hinged for access into the enclosure. The top cover also includes a clear plate for viewing tubing while material is applied to the tubing.

These and other features of the present invention can be best understood from the following specification and drawings, of which the following is a brief description.

DETAILED DESCRIPTION OF THE INVENTION

Figure 1:
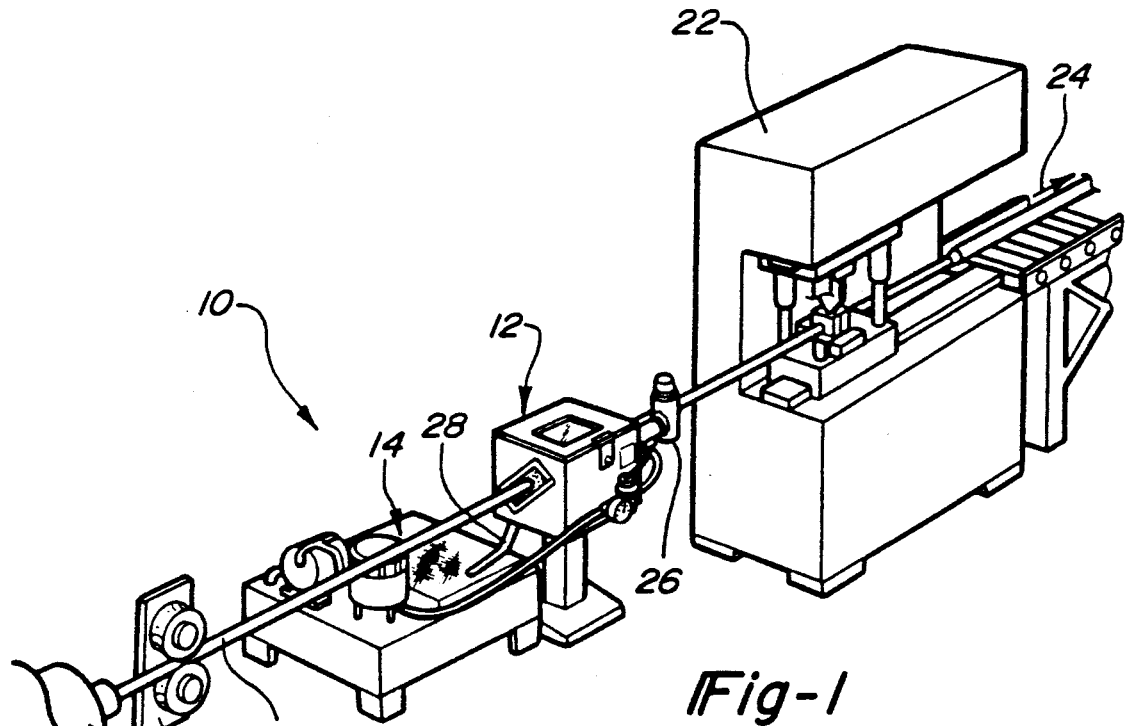
FIG. 1 is a perspective view of the spray applicator system operating in between forming operations for the tubing.

With reference to FIG. 1, the spray application system of the present invention is shown generally at 10 and includes an enclosure 12 and a material reclaim unit 14. Tubing 16 is formed at the extrusion operation 18, and processed through a forming operation at 20. Material is then applied in-line before tubing 16 is sectioned into segments at press 22. The tubing 16 continues to travel at a constant rate along the direction indicated at 24 while the tubing 16 is extruded, treated, and sectioned.

The inventive spray applicator system 10 further includes a coalescing filter 26 which allows for release of air pressure and collection of excess material. Unused, or excess material is also collected at port 28 located along a bottom portion of the enclosure 12.

The material applied to tubing 16 varies from cleaners, to rust preventatives, to other treatment material. Cleaners are applied to tubing 16 in relatively large quantities. When using cleaners, excess material is filtered through the coalescing filter 26, or collected at port 28, into the reclaim unit 14, as shown in FIG. 1. The reclaim unit 14 collects the cleaner material, filters it, and pumps it back to the spray applicator enclosure 12 for continued use. When applying other material to tubing 16, such as rust preventatives, significantly less material is used, and the reclaim unit 14 is not necessary. A container under the enclosure 12 is often sufficient to collect the material.

The primary advantages of the inventive spray applicator system is that material may be applied to tubing 16 during in-line processing and that material is not released to the surrounding environment. Further, the spray applicator system allows for an enclosed spray which is applied in precise amounts. This feature is important where expensive, flammable, or harmful chemicals are applied. Most of the material used can be reclaimed, and reused.

Figure 2:
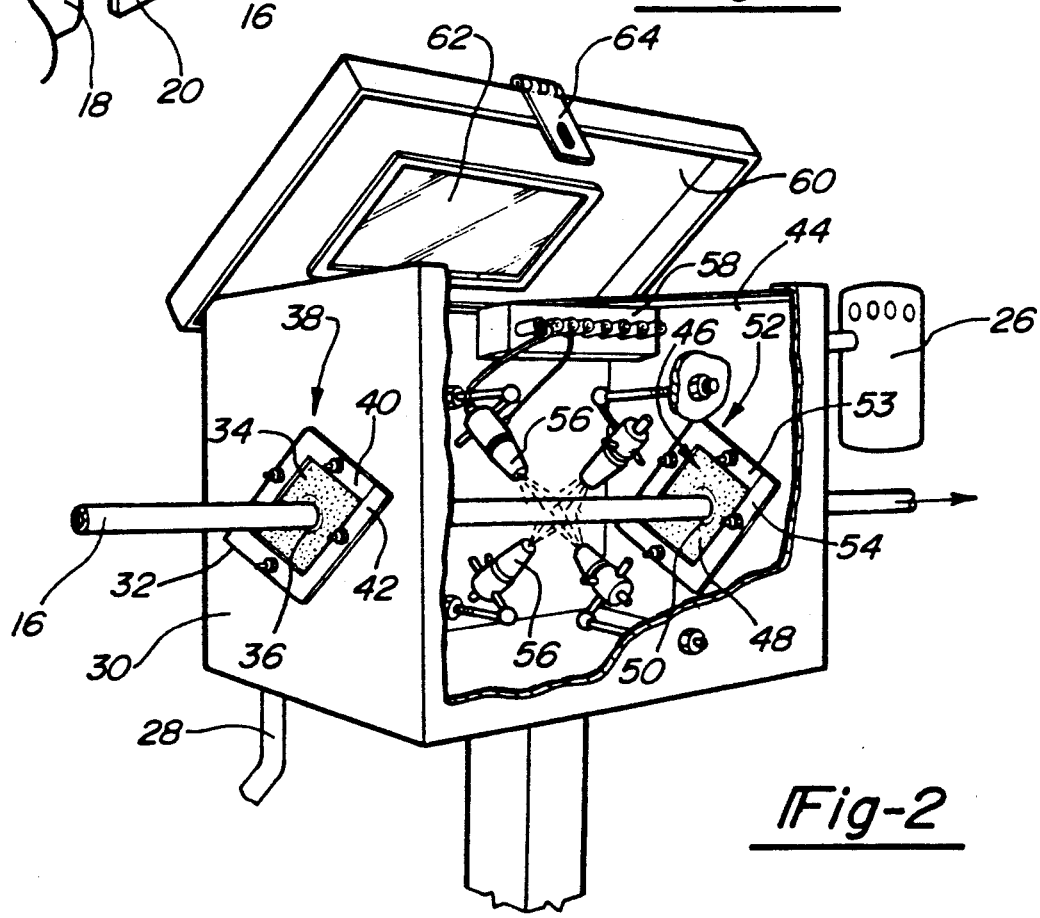
FIG. 2 is a fragmentary perspective view of the inventive spray applicator system illustrating the spray nozzles within the sealable enclosure.

FIG. 2 illustrates details of the spray applicator enclosure 12. Enclosure 12 includes a plurality of walls, each wall having internal and external surfaces, wherein the internal surfaces face towards the interior and the external surfaces face towards the outside of enclosure 12. Tubing 16 enters enclosure 12 through entrance wall 30 which includes an opening 32. Entry wipe 34 includes an aperture 36 and is secured on an external surface of entrance wall 30 over opening 32. Bracket 38, which is formed of two components 40 and 42, is used to secure the wipe. As the tubing 16 passes through aperture 36 of the entry wipe 34, particles, foreign matter, and debris are cleaned from tubing 16.

Tubing 16 exits the enclosure 12 through the exit wall 44 which includes an opening 46. Exit wipe 48 includes an aperture 50, and is secured to an internal surface of exit wall 44. Bracket 52, which is formed of two components 53 and 54, is used to secure the wipe. As the tubing passes through aperture 50 of the exit wipe 48, material is equally dispersed on the tubing 16.

The wipes, which are formed of foam rubber, are generally chemical resistant, highly wear resistant, and show little shrinkage, stretching, or hardening over time. The wipes are larger than the openings 32 and 46 in the enclosure 12 and have a generally square shape with four edges, although any shape may be used. The thickness of the wipes varies depending on usage. In the center of each wipe is an aperture which the tubing 16 passes through to enter and exit the enclosure 12. The aperture of the wipe is dimensioned and shaped slightly smaller than the outer dimensions of tubing 16 to ensure wiping contact.

Within enclosure 12 material is applied to tubing 16 by an application means, such as a plurality of spray nozzles 56. Although four spray nozzles 56 are shown equally spaced around the spray area for tubing 16, any number of spray nozzles 56 or configurations could be used. In a preferred embodiment, material and pressurized air are supplied to atomizing spray nozzles through a distributing manifold 58.

In order to access the enclosure 12 a top cover 60 is hinged along an upper edge of enclosure 12. In this manner, access to the internal portions of the enclosure 12 is made simple and easy. Top cover 60 may be locked in a closed position by use of latch 64. A clear plate 62 is provided so that an operator may view the spray applicator system 12 during operation.

Figure 3:
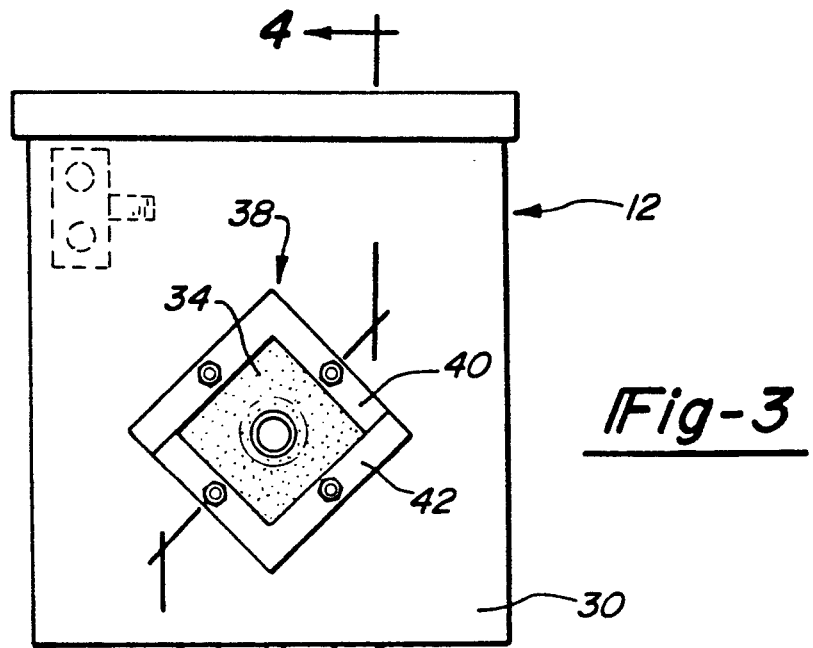
FIG. 3 is a side view illustrating a wipe at the entrance of the enclosure.

FIG. 3 illustrates the entry wall 30 of the spray applicator enclosure 12. The two components 40 and 42 of bracket 38 secure entry wipe 34 along its outer edges. Bracket 38 partially covers the outer surface of wipe 34. After the bracket components 40 and 42 are in place, securing means such as a nut and bolt combination maintain the assembly in place. In a similar fashion, the exit wipe 48 is secured to the exit wall 44.

Figure 4:
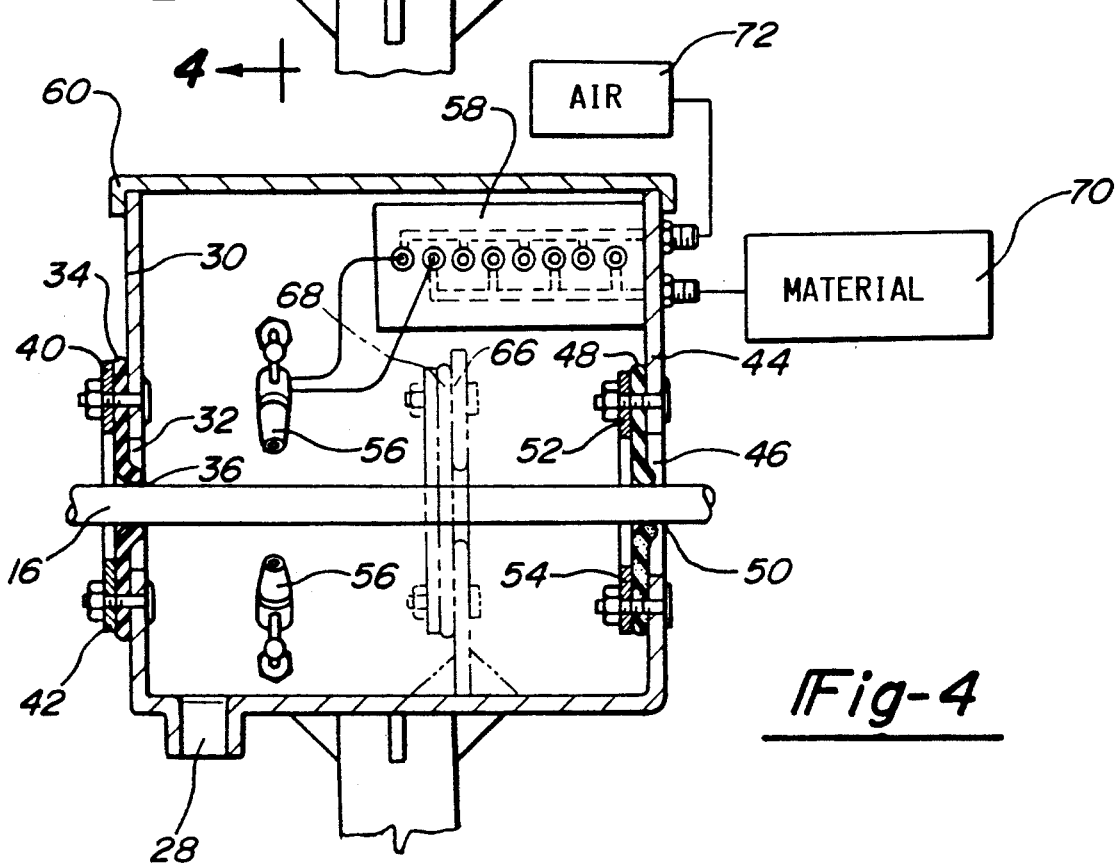
FIG. 4 is a cross-sectional view along line 4—4 as shown in FIG. 3.

As shown in FIG. 4, the entry wipe 34 is secured to an external surface of the enclosure 12, while the exit wipe 46 is secured to an internal surface of the enclosure 12. This arrangement allows for each wipe to be biased against a surface of enclosure 12. As tubing 16 passes through the enclosure 12, each wipe 34 and 48 is forced away from its bracket instead of towards its bracket. This arrangement helps to maintain wipes 34 and 48 in proper position.

In some situations, an additional wipe may be desired. In such a situation, a mounting wall 66, shown in phantom in FIG. 4, is provided for a third wipe 68. The third wipe 68 is secured to the mounting wall 66, which includes an opening, such that the third wipe 66 is forced against the mounting wall 66 as the tubing 16 passes through the enclosure 12.

Each atomizing spray nozzle 56 must be supplied material 70 and air 72 which is pressurized. Material 70 and air 72 are supplied to the enclosure 12 by a single source, but are distributed to each nozzle 56 by the distribution manifold 58. By varying the amount of pressure, the amount of material 70 applied to the tubing 16 may vary from a fine mist to a heavy concentration. Different spray nozzles 56 allow for various spray patterns, liquid volume, and dispersing air pressure. Excess material 70 may be collected for reuse at coalescing filter 26 and port 28.

Top cover 60 is shown in the closed, seal position in FIG. 4. When tubing 16 extends through the entry wipe 34 and exit wipe 48, with the top cover 60 closed, the enclosure provides a sealed environment for applying material.

The enclosure 12 is preferably made of carbon 14 gauge steel. The spray applicator system 10 may be actuated at the central drive source for the tube formation operation. Alternatively, the applicator system 10 may be independently operated with an electric eye or limit switch actuated by the presence of tubing within enclosure 12.

Figure 5:
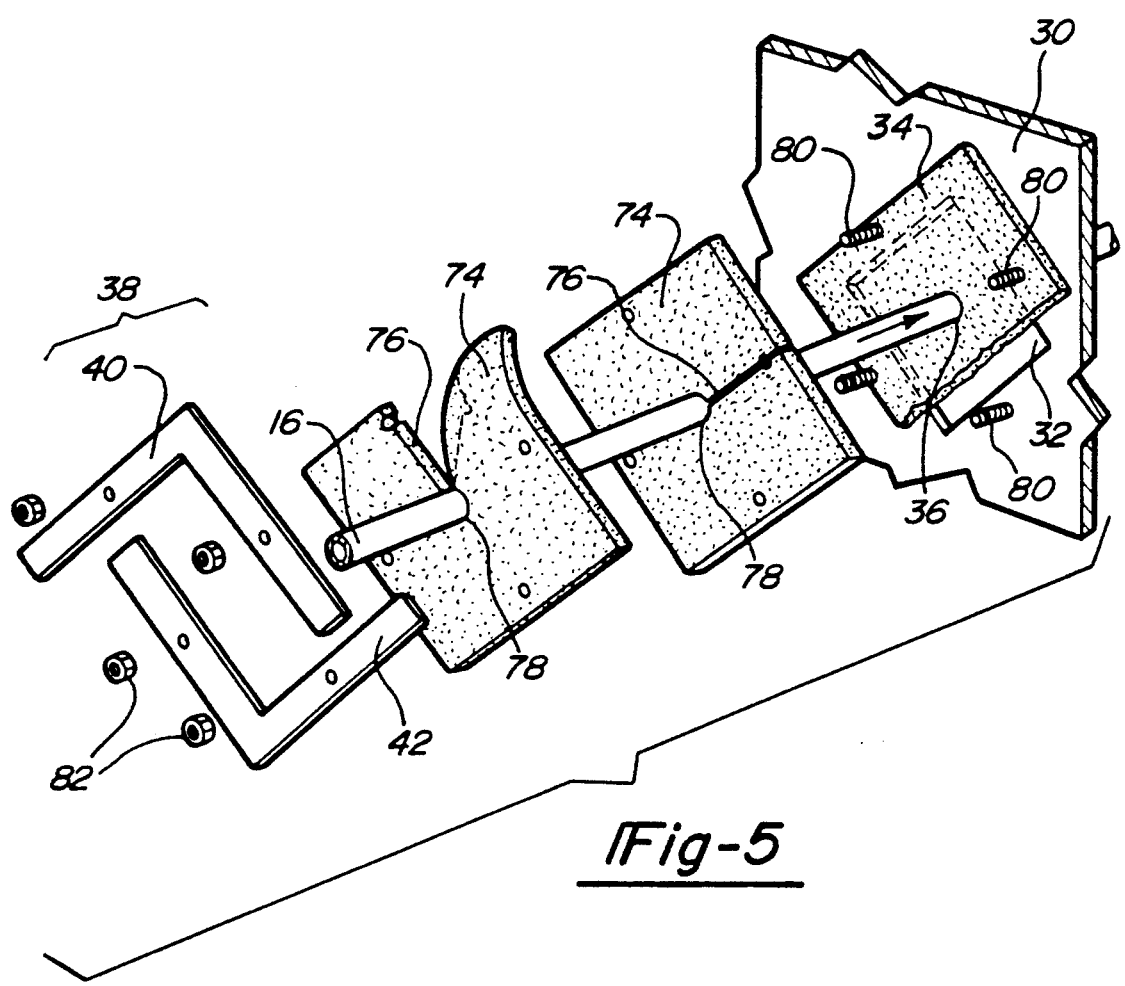
FIG. 5 is an exploded view illustrating the bracket and replacement of wipes without removal of the tubing.

Illustrated in FIG. 5 is the securing of initial wipes and the addition of replacement wipes. Although the entrance wipe 34 is illustrated, it is understood that all wipes are secured and replaced in this manner. Before the start of tube forming operations, the initial entrance wipe 34 is secured over the opening 32 in the entrance wall 30. The bracket 38 extends along each outer of edge of the wipe and partially over a surface of the wipe.

Should wipe 34 need replacement during operation, a replacement wipe 74 may be secured without breaking or cutting a section of tubing 16. The bracket 38 has a discontinuous periphery, and is comprised of two L-shaped components 40 and 42 which allow removal while tubing extends into and out of the enclosure 12. Bracket 38 not need to be comprised of two components, and could even be a single component, as long as the bracket allows access to the wipes. Bracket 38 secures the wipe along its outer surface, and does not extend around the edges of the wipe. This feature of bracket 38 allows for wipes of varying thickness, or a plurality of wipes to be secured utilizing the same bracket. To add a wipe, the forming operation is temporarily stopped, bracket components 40 and 42 are removed, and a replacement wipe 74 is inserted next to the initial wipe 34. In some circumstances, the initial wipe 34, which does not include a slit, must be cut and removed.

Replacement wipes 74 include a slit 76 which extends from an aperture 78 at the center of the wipe and extends to the outer edge of the wipe. As additional replacement wipes 74 are required, the slit 76 is offset from the slit of the previous replacement wipe 74. The wipes 34 and 74, and bracket 38 are placed on bolts 80. After the wipes and bracket are positioned, nuts 82 are added and tightened to secure the assembly in place.

An example of a preferred embodiment which has actually been built has the following shape and dimensions. The enclosure is essentially a box-like structure having a height of 16". the base of the enclosure is rectangular having dimensions of 14"×16". The entry and exit walls 30 and 44 are 16"×16". Additionally, the wipes are essentially square having dimensions of 8"×8" and are ¼" thick.

A preferred embodiment of the present invention has been disclosed, however, a worker of ordinary skill in the art would realize that certain modifications of this invention would be obvious from the teachings of this application. Thus, the following claims should be studied in order to determine the true scope and content of the invention.

What is claimed is:

1. Apparatus adapted for applying material to tubing in an enclosed environment, comprising:
    an enclosure having an end wall including a tubing entrance opening, and an end wall including a tubing exit opening, each of said openings including wiping means which are biased against said respective end walls for wiping the exterior surface of tubing passing therethrough; and
    a spray nozzle means within said enclosure for applying material to said tubing.

2. The apparatus of claim 1, wherein said wiping means comprise foam rubber wipes secured to the enclosure at said openings, said foam rubber wipes including an aperture dimensioned and shaped to ensure wiping contact with the outer surface of said tubing, but otherwise substantially covering said openings.

3. The apparatus of claim 1, wherein said enclosure further includes:
    each of said end walls having internal and external surfaces, said internal surfaces facing towards the interior of said enclosure, and said external surfaces facing towards the outside of said enclosure;
    said wall including said tubing entrance opening comprising a first wiping means secured to an external surface of said end wall substantially covering said tubing entrance opening, such that said first wiping means is biased towards said enclosure as said tubing passes therethrough; and
    said wall including said tubing exit opening comprising a second wiping means secured to an internal surface of said end wall substantially covering said tubing exit opening, such that said second wiping means is biased towards said enclosure as said tubing passes therethrough.

4. The apparatus of claim 3, wherein said first of said walls and said second of said walls are opposed.

5. A spray applicator apparatus adapted for use in applying material to tubing in an enclosed environment, comprising;
    an enclosure including a plurality of walls which create an enclosed area, each said wall having internal and external surfaces, said internal surfaces facing towards interior of said enclosure, and said external surfaces facing towards outside of said enclosure;
    an entry wall including an opening for said tubing to enter said enclosure;
    an exit wall including an opening for said tubing to exit said enclosure, said exit wall longitudinally spaced from said entry wall;
    an entry wipe secured to an external surface of said entry wall substantially covering said entry wall opening, said entry wipe including an aperture allowing said tubing to pass therethrough;
    an exit wipe secured to an internal surface of said exit wall substantially covering said exit wall opening, said exit wipe including an aperture allowing said tubing to pass therethrough; and
    spray nozzle means within said enclosure to apply said material to an outer surface of said tubing.

6. The spray apparatus of claim 5 which further comprises a filter means for release of pressure within said enclosure, and a collection means along a bottom portion of said enclosure for collection of excess of said material.

7. The spray apparatus of claim 5, wherein a third wipe is secured to a mounting wall within said enclosure, said mounting wall having an opening, said third wipe secured to said mounting wall substantually covering said opening, and said third wipe including an aperture allowing said tubing to pass therethrough.

8. The spray apparatus of claim 5, wherein said wipes comprise foam rubber wipes.

9. The spray apparatus of claim 8 which further comprises a bracket means accommodating wipes of varying thickness.

10. The spray apparatus of claim 5, wherein said wipes are secured by a bracket allowing for wipes to be added or removed while tubing extends through said enclosure.

11. The spray application apparatus of claim 10, further comprising an added wipe which includes a slit which extends from the aperture to an outer edge of said wipe, allowing said wipe to be placed over said tubing without cutting, or removing said tubing.

12. A method of treating tubing in an enclosed environment, said method comprising the steps of:
    (1) wiping said tubing as said tubing enters an enclosure;
    (2) spraying material onto the exterior surface of said tubing within said enclosure; and
    (3) wiping said tubing as said tubing exits said enclosure; each of said wiping steps comprising using wipes which are biased against end walls of said enclosure.

13. The method of treating tubing of claim 12 which further includes the step of locating a first foam rubber wipe at an entrance opening as said tubing enters said enclosure and locating a second foam rubber wipe at an exit opening as said tubing exits said enclosure, said first and second wipes having an aperture for wiping the exterior surface of said tubing passing therethrough, said aperture dimensioned and shaped to ensure wiping contact with the outer surface of said tubing.

14. The method of treating tubing of claim 12, further comprising the steps of collecting excess material applied to said tubing within said enclosure, and reclaiming said excess material to apply to said tubing.

15. The method of treating tubing of claim 12, wherein said tubing is longer than said enclosure and further comprising the step of adding wipes to said enclosure while said tubing extends through said enclosure.

16. A method of treating tubing in an enclosed environment, said method comprising the steps of:
   (1) wiping said tubing as said tubing enters an enclosure;
   (2) applying material to said tubing within said enclosure, said tubing being longer than said enclosure and extending through said enclosure;
   (3) wiping said tubing as said tubing exits said enclosure; and
   (4) adding a wipe for wiping said tubing to said enclosure while said tubing extends through said enclosure.

17. The method of treating tubing of claim 16 which further includes the step of locating a first foam rubber wipe at an entrance opening as said tubing enters said enclosure and locating a second foam rubber wipe at an exit opening as said tubing exits said enclosure, said first and second wipes each having an aperture for wiping the exterior surface of said tubing passing therethrough, said apertures dimensioned and shaped to ensure wiping contact with the outer surface of said tubing.

18. The method of treating tubing of claim 16, wherein the step of applying further comprises spraying said material onto the exterior surface of said tubing.

19. The method of treating tubing of claim 16, further comprising the steps of collecting excess material applied to said tubing within said enclosure, and reclaiming said excess material to apply to said tubing.

* * * * *